United States Patent
Evans et al.

(10) Patent No.: US 10,125,875 B2
(45) Date of Patent: Nov. 13, 2018

(54) CHOKE PLUG TIP

(71) Applicant: Cameron International Corporation, Houston, TX (US)

(72) Inventors: Finbarr Evans, Ballynacargy (IE); Edmund Peter McHugh, Longford Town (IE); David Francis Anthony Quin, Killoe (IE)

(73) Assignee: Cameron International Corporation, Houston, TX (US)

( * ) Notice: Subject to any disclaimer, the term of this patent is extended or adjusted under 35 U.S.C. 154(b) by 47 days.

(21) Appl. No.: 15/169,525

(22) Filed: May 31, 2016

(65) Prior Publication Data

US 2017/0343119 A1  Nov. 30, 2017

(51) Int. Cl.
| | | |
|---|---|---|
| *F16K 5/10* | (2006.01) | |
| *B23P 15/00* | (2006.01) | |
| *E21B 34/02* | (2006.01) | |
| *F16K 3/24* | (2006.01) | |
| *F16K 25/00* | (2006.01) | |
| *F16K 25/04* | (2006.01) | |

(52) U.S. Cl.
CPC .............. *F16K 5/10* (2013.01); *B23P 15/001* (2013.01); *E21B 34/02* (2013.01); *F16K 3/246* (2013.01); *F16K 25/005* (2013.01); *F16K 25/04* (2013.01)

(58) Field of Classification Search
CPC ... F16K 5/10; F16K 3/24; F16K 25/04; F16K 1/34; F16K 1/36; F16K 25/005; F16K 3/246; B23P 15/001
USPC .............................. 251/368, 120–122, 324; 137/329.01–329.04
See application file for complete search history.

(56) References Cited

U.S. PATENT DOCUMENTS

| | | | | |
|---|---|---|---|---|
| 3,570,806 A | * | 3/1971 | Sturman | F16K 31/082 251/282 |
| 4,190,073 A | * | 2/1980 | Claycomb | F16K 25/04 251/324 |
| 4,240,609 A | | 12/1980 | Baker et al. | |
| 4,257,442 A | * | 3/1981 | Claycomb | F16K 25/04 137/329.02 |
| 4,355,784 A | * | 10/1982 | Cain | E21B 21/106 251/121 |
| 4,503,878 A | * | 3/1985 | Taylor | F16K 25/04 251/122 |

(Continued)

FOREIGN PATENT DOCUMENTS

| | | |
|---|---|---|
| CN | 201896960 U | 7/2011 |
| EP | 0520567 A1 | 12/1992 |

(Continued)

OTHER PUBLICATIONS

PCT International Search Report & Written Opinion for PCT Application No. PCT/US2017/034547 dated Aug. 4, 2017.

*Primary Examiner* — John Bastianelli
(74) *Attorney, Agent, or Firm* — Fletcher Yoder, P.C.

(57) ABSTRACT

A choke valve includes a choke body, a choke trim disposed in the choke body, where the choke trim is configured to adjust a cross-sectional area of a flow path in the choke body to adjust a fluid flow through the choke valve, a choke plug of the choke trim disposed in the flow path of the fluid flow, a stem of the choke plug that includes a first material, and a tip portion of the choke plug coupled to the stem, where the tip portion includes a superhard material.

18 Claims, 14 Drawing Sheets

(56) References Cited

U.S. PATENT DOCUMENTS

| | | | | |
|---|---|---|---|---|
| 4,732,364 | A * | 3/1988 | Seger | F16K 25/04 |
| | | | | 251/122 |
| 5,368,273 | A * | 11/1994 | Dante | F16K 47/04 |
| | | | | 251/122 |
| 7,025,140 | B2 * | 4/2006 | McGee | B01D 21/2483 |
| | | | | 166/267 |
| 7,137,612 | B2 * | 11/2006 | Baca | F16K 1/38 |
| | | | | 251/122 |
| 7,363,937 | B2 * | 4/2008 | Suter | F16K 47/08 |
| | | | | 251/324 |
| 2001/0013587 | A1 * | 8/2001 | Robison | F16K 1/48 |
| | | | | 251/368 |
| 2005/0072464 | A1 | 4/2005 | Schmidt et al. | |
| 2011/0226980 | A1 * | 9/2011 | Richardson | F16K 47/04 |
| | | | | 251/368 |
| 2016/0123099 | A1 | 5/2016 | Kapavarapu et al. | |

FOREIGN PATENT DOCUMENTS

| | | |
|---|---|---|
| JP | 2010121735 A | 6/2010 |
| WO | 2015115907 A1 | 8/2015 |

\* cited by examiner

CHOKE PLUG TIP

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In certain fluid-handling systems, such as mineral extraction systems, a variety of flow control devices are used to control a flow rate, a pressure, and other parameters of fluid flow. For example, in mineral extraction systems, choke valves may be utilized to regulate the flow of production fluid (e.g., oil, gas, and water) from a well. These valves may include a choke body with a movable valve member (e.g., a choke plug) disposed therein. An actuator drives the movable valve member over an opening of the choke body through which the fluid flows. Shifting the position of the movable valve member relative to the opening adjusts the flow rate of the fluid through the opening. Unfortunately movable valve members may be subject to relatively high pressure environments, which may lead to wear, erosion, and other degradation. Accordingly, it may be desirable to utilize a movable valve member with enhanced durability in fluid handling systems.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
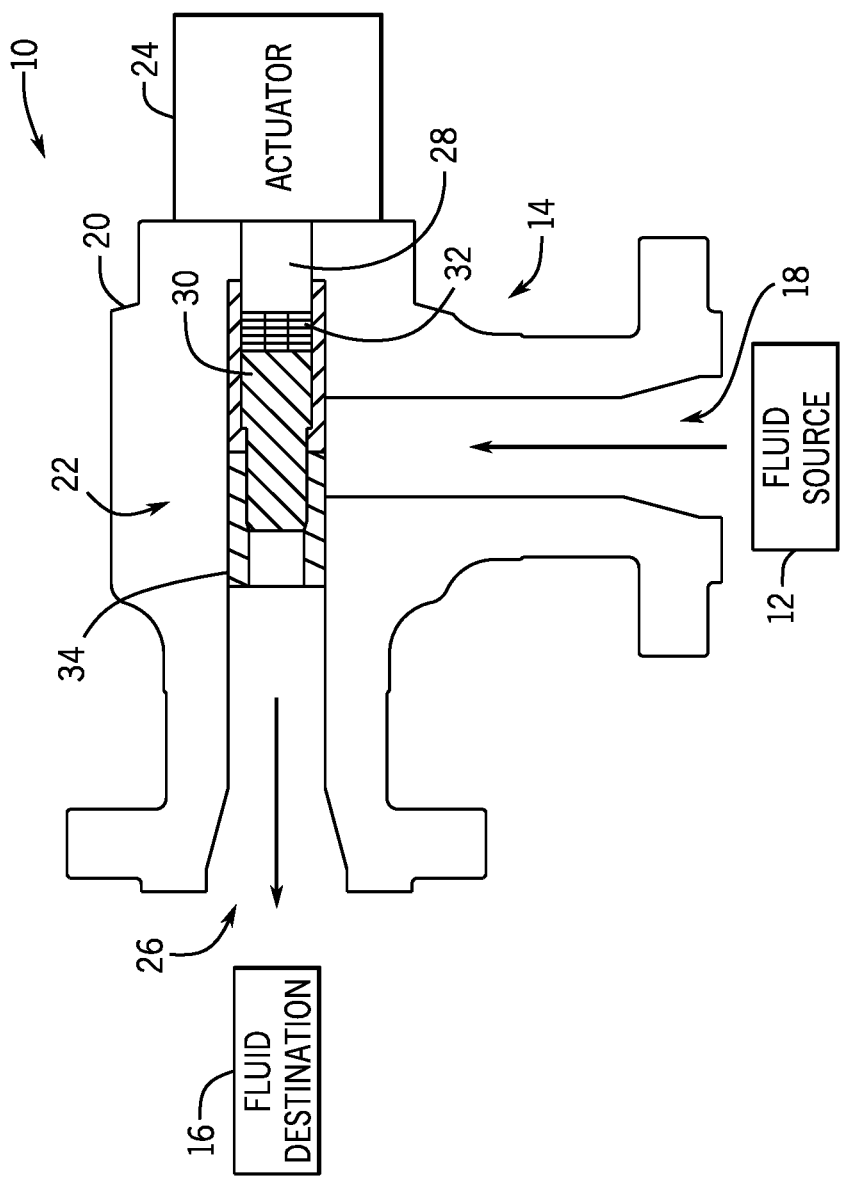
FIG. 1 is a schematic of a fluid-handling system including a choke valve, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "fluid" encompasses liquids, gases, vapors, and combinations thereof.

Embodiments of the present disclosure are directed toward fluid-handling systems, such as a fluid-handling system for a mineral extraction system. Fluid-handling systems may include a choke valve that includes a choke body and a choke trim disposed within the choke body. The choke trim may include a choke plug configured to move relative to an opening in the choke valve to adjust a fluid flow through the choke valve. The choke trim may also include a stem coupled to an actuator that may be configured to move the choke plug with respect to the opening, thereby adjusting a cross-sectional area of a fluid flow path extending through the choke body to adjust the fluid flow. In some cases, the choke plug may incur degradation (e.g., erosion) and/or wear as a result of high pressures experienced at a tip portion of the choke plug. Traditional choke plugs may include a tungsten carbide material, which may be vulnerable to degradation, thereby leading to replacement of the choke plug after a relatively short duration.

Accordingly, it may be desirable to utilize a choke plug that includes at least a tip portion having a superhard material (e.g., a diamond-based material, polycrystalline cubic boron nitride, a material with a hardness value exceeding approximately (e.g., within 1%-10%) 20 gigaPascals (GPa) based on the Vickers hardness test, and/or a material with a hardness value exceeding approximately (e.g., within 1%-10%) 4500 Hardness Brinell (HB) on the Brinell scale). However, due to manufacturing tolerances (e.g., size limitations) and/or cost constraints, a superhard material may not be included in the entire choke plug (e.g., the choke plug is not fully constructed of the superhard material). Therefore, it is now recognized that it may be desirable to couple a tip portion of the choke plug that includes the superhard material to a stem and/or plug body that does not include a superhard material (e.g., includes a traditional material such as tungsten carbide).

As used herein, a superhard material may include a diamond-based material (e.g., silicon centered diamond, polycrystalline diamond, and/or another material that includes diamond), a polycrystalline cubic boron nitride, a material that includes a hardness value exceeding 20 GPa based on the Vickers hardness test, and/or a material that includes a hardness value exceeding 4500 HB on the Brinell scale. As a non-limiting example, the superhard material may include a Versimax™ grade material made commercially available by Sandvik Hyperion of Sandviken Sweden. In any case, the tip portion of the choke plug may include a superhard material that may enable the choke plug to better withstand high pressures experienced within the choke valve body when compared to traditional choke plugs. Accordingly, a durability of the fluid-handling system may be enhanced.

To help illustrate the manner in which the present embodiments may be used in a system, FIG. 1 illustrates an embodiment of a fluid-handling system 10. The fluid-handling system 10 may be part of an energy-acquisition or processing system, e.g., a hydrocarbon-production or processing system, such as a subsea or surface oil or gas well. In some embodiments, the fluid-handling system 10 may be a gas-uplift system, a water-injection system, a water/steam/chemicals injection system, or other system for conveying fluids. The fluid-handling system 10 includes a fluid source 12, a choke valve 14, and a fluid destination 16. The fluid source 12 may include a variety of fluid sources, such as an oil or natural gas well. The fluid source 12 may supply a variety of fluids, such as air, natural gas, oil, water (steam or liquid), or combinations thereof. The fluid arriving from the source 12 may be at relatively high pressures, e.g., pressures greater than 500 psi, 1000 psi, 5000 psi, 10,000 psi, 15,000 psi, 20,000 psi, 25,000 psi, or 30,000 psi. Additionally, the pressure of the fluid arriving from the source 12 may be higher than the pressure at the fluid destination 16.

The choke valve 14 includes an inlet 18, a choke body 20 (e.g., a production choke body and/or a universal choke body), a choke trim 22 disposed within the choke body 20, an actuator 24, and a fluid outlet 26. The actuator 24 may modulate flow between the inlet 18 and the outlet 26 by adjusting the position of the choke trim 22 or a component of the choke trim 22 (e.g., a choke plug) relative to the choke body 20. The component of the choke trim 22 (e.g., a choke plug) may adjust a cross-sectional area of a flow path of the fluid through the choke body, thereby adjusting the flow between the inlet 18 and the outlet 26. For example, the actuator 24 may be a manual actuator (e.g., a wheel), an electro-mechanical actuator (e.g., an electric drive or motor), a hydraulic actuator (e.g., a fluid driven actuator), or other suitable type of actuator. To adjust the position of the choke trim 22 or a component of the choke trim 22 (e.g., a choke plug), the actuator 24 may exert a translational force on a shaft 28 coupled to the actuator 24 and the choke trim 22 or the component of the choke trim 22 (e.g., a stem and/or a choke plug 30).

As mentioned above, the choke trim 22 may include the choke plug 30. In some embodiments, one or more springs 32 may be disposed between the choke plug 30 and the shaft 28 such that a biasing force is applied to the choke plug 30. The spring 32 may be any suitable biasing member, such as a series (e.g., stack) of tapered annular washers (e.g., Bellville washers), one or more coil springs (e.g., stacked or concentric springs), an elastic material (e.g., a ring made of rubber or elastomer), or any combination thereof. During movement of the choke trim 22 to a closed position in which the choke plug 30 is fully seated against a seat 34 (e.g., an annular seat), the spring 32 may advantageously reduce a load applied by the choke plug 30 to the seat 34 and/or reduce a load applied by the shaft 28 to the plug 30, thereby reducing wear on certain components of the choke valve 14. In other embodiments, the choke valve 14 may not include the springs 32.

Figure 2:
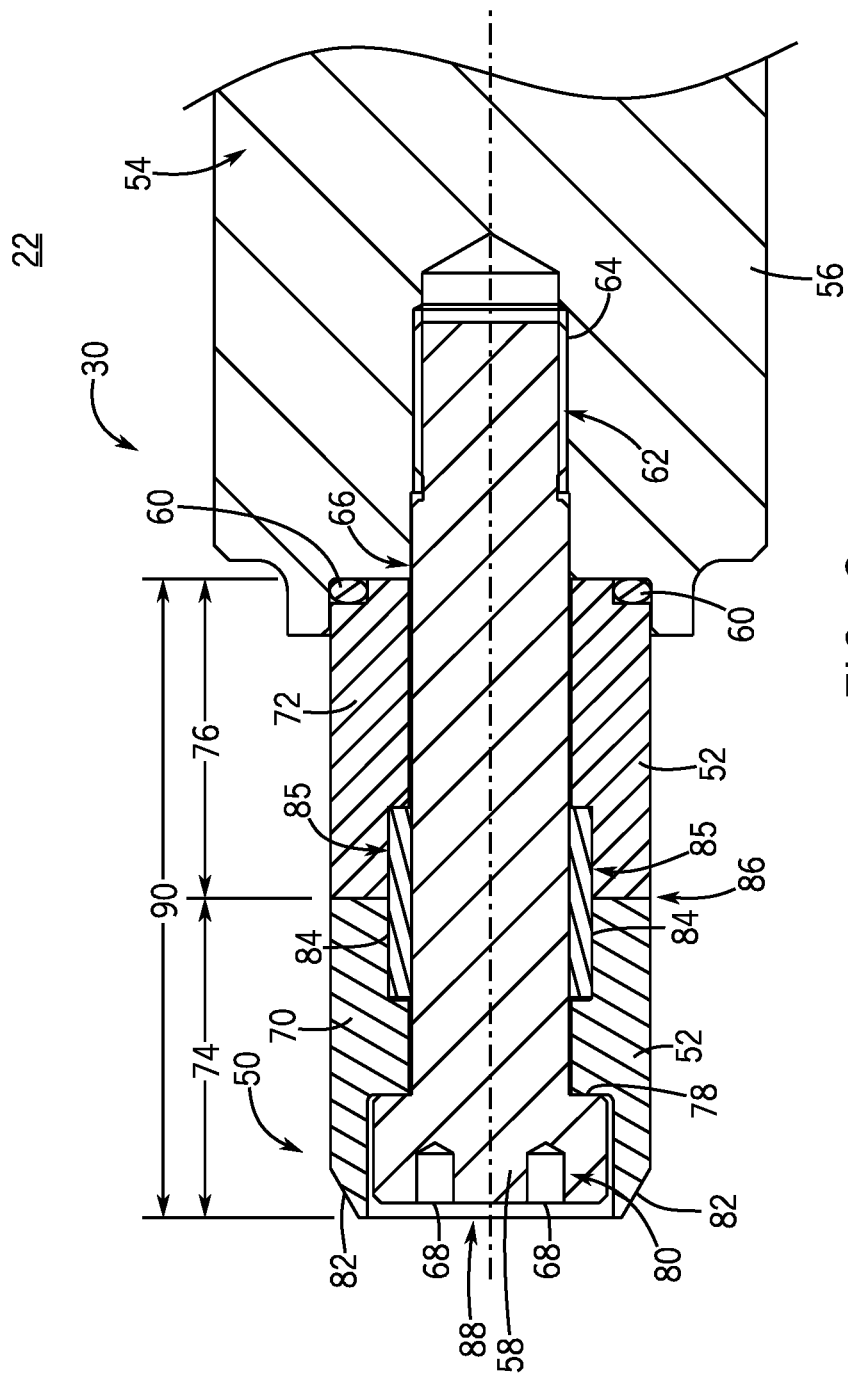
FIG. 2 is a cross-sectional side view of an embodiment of a choke plug of the choke valve of FIG. 1, illustrating a fastener and a shim disposed in a tip portion of the choke valve, in accordance with an embodiment of the present disclosure.

As discussed above, the choke trim 22 may experience relatively high pressures, thereby leading to degradation (e.g., wear) on components of the choke trim 22 (e.g., the choke plug 30). As shown in FIG. 2, the choke plug 30 may include a tip portion 50 that includes a first material 52 (e.g., a superhard material). Additionally, the tip portion 50 may be coupled to a stem 54 (e.g., the stem 54 may be disposed upstream of the tip portion 50 relative to the flow path of fluid through the choke body 20) of the choke plug 30, which may include a second material 56 (e.g., a non-superhard material). In certain embodiments, the stem 54 may include a traditional material utilized in fluid-handling systems 10 such as a nickel alloy, tungsten carbide, steel, or another suitable material. However, utilizing traditional coupling techniques (e.g., welding) may be undesirable because the tip portion 50 and the stem 54 include different materials (e.g., different metals). Accordingly, embodiments of the present disclosure introduce a variety of techniques that may be utilized to couple (e.g., fixedly attach) the tip portion 50 having a superhard material to the stem 54 such that the durability of the fluid-handling system 10 may be enhanced.

As shown in the illustrated embodiment of FIG. 2, the tip portion 50 is coupled (e.g., fixedly attached) to the stem 54 of the choke plug 30 via a fastener 58 and a seal 60 (e.g., a metal seal and/or an elastomeric seal). The fastener 58 may be a screw, a bolt, a rivet, threaded fastener, or any other device configured to couple the tip portion 50 to the stem 54. In certain embodiments, the fastener 58 may include a threaded portion 62 which may be configured to couple to threads 64 disposed in an opening 66 of stem 54. Accordingly, the fastener 58 may include one or more recesses 68 configured to receive a tool (e.g., a screwdriver or wrench) configured to tighten the fastener 58 such that a secure connection is established between the tip portion 50 and the stem 54. In some embodiments, the fastener 58 may include the second material 56 (e.g., the same material as the stem 54). However, in other embodiments, the fastener 58 may include another suitable material.

As used herein, the seal 60 may be a washer, an "O"-ring, and/or another sealing device that includes a metallic material and/or an elastomeric material. In certain embodiments, the seal 60 may be used to reduce a pressure differential between the tip portion 50 and the stem 54, which may enable the choke plug 30 to effectively adjust a flow rate of fluid through the choke body 20 by adjusting a cross-sectional area of a flow path extending through the choke body 20. The seal 60 may include the first material 52, the second material 56, and/or another suitable material (e.g., metal and/or elastomeric material).

The first material 52 utilized in the tip portion 50 may include a superhard material (e.g., a diamond-based material, polycrystalline cubic boron nitride, a material with a hardness value exceeding approximately (e.g., within 1% and 10%) 20 GPa based on the Vickers hardness test, and/or a material with a hardness value exceeding approximately (e.g., within 1% and 10%) 4500 HB on the Brinell scale). As such, the tip portion 50 may include a first segment 70, a second segment 72, and/or additional segments to accommodate manufacturing tolerances that may limit the size of commercially available components that include superhard materials. However, it may be desirable to form a choke plug having a tip portion with a superhard material and configured to have generally the same size as a traditional choke plug. Accordingly, the enhanced choke plug 30 (e.g., having a superhard tip portion) may be installed in existing fluid-handling systems 10 without modification. In some embodiments, multiple segments (e.g., 2, 3, 4, 5, or more) containing the superhard material may be used to form the enhanced choke plug 30 that is generally the same size as a traditional choke plug.

As shown in the illustrated embodiment of FIG. 2, the tip portion 50 includes the first segment 70 and the second segment 72. For example, the first segment 70 includes a first length 74, and the second segment 72 includes a second length 76. In some embodiments, the sum of the first length 74 and the second length 76 may be generally the same as the total length of a traditional choke plug. In certain embodiments, both the first segment 70 and the second segment 72 may include the first material 52 (e.g., a superhard material). In embodiments having multiple segments, the first segment 70 and the second segment 72 may be coupled together via a brazing technique. Additionally, the first segment 70 may include a recess 78 configured to contact a head portion 80 of the fastener 58. Accordingly, as the fastener 58 is threaded into the threads 64 of the stem 54, the first segment 70, the second segment 72, and the stem 54 are secured to one another. Further, the first segment 70 may include a beveled edge 82, which may reduce stress and wear on the tip portion 50 by facilitating flow of the fluid over the tip portion 50 (e.g., the beveled portion 82 may reduce erosion of the tip portion 50 caused by fluid flow).

Additionally, a shim 84 may be disposed in a recess 85 of the first segment 70 and the second segment 72 to extend across a joint 86 between the first segment 70 and the second segment 72. In some embodiments, the shim 84 may strengthen the bond between the first segment 70 and the second segment 72. For example, the shim 84 may include portions contacting the first segment 70 and portions contacting the second segment 72. Further, in some embodiments, the shim 84 may enable an opening 88 in the first segment 70 and the second segment 72 to include a generally uniform geometry along a total length 90 of the tip portion 50. Accordingly, the shim 84 may ensure that the first segment 70 and the second segment 72 are generally aligned such that the opening 88 may receive the fastener 58 without obstruction.

In some embodiments, it may be desirable to include additional coupling features between the first segment 70 and the second segment 72 to reduce stress that may occur at the joint 86 between the first segment 70 and the second segment 72 (e.g., due to vibration). For example, as fluid flows through the choke body 20 and/or over the tip portion 50, pressure fluctuations as a result of fluid flow may cause the tip portion 50 to vibrate. Such vibrations may cause stress on the joint 86 between the first segment 70 and the second segment 72, which may eventually lead to degradation of the tip portion 50. Therefore, additional coupling features may be utilized to further stabilize the joint 86 between the first segment 70 and the second segment 72.

Figure 3:
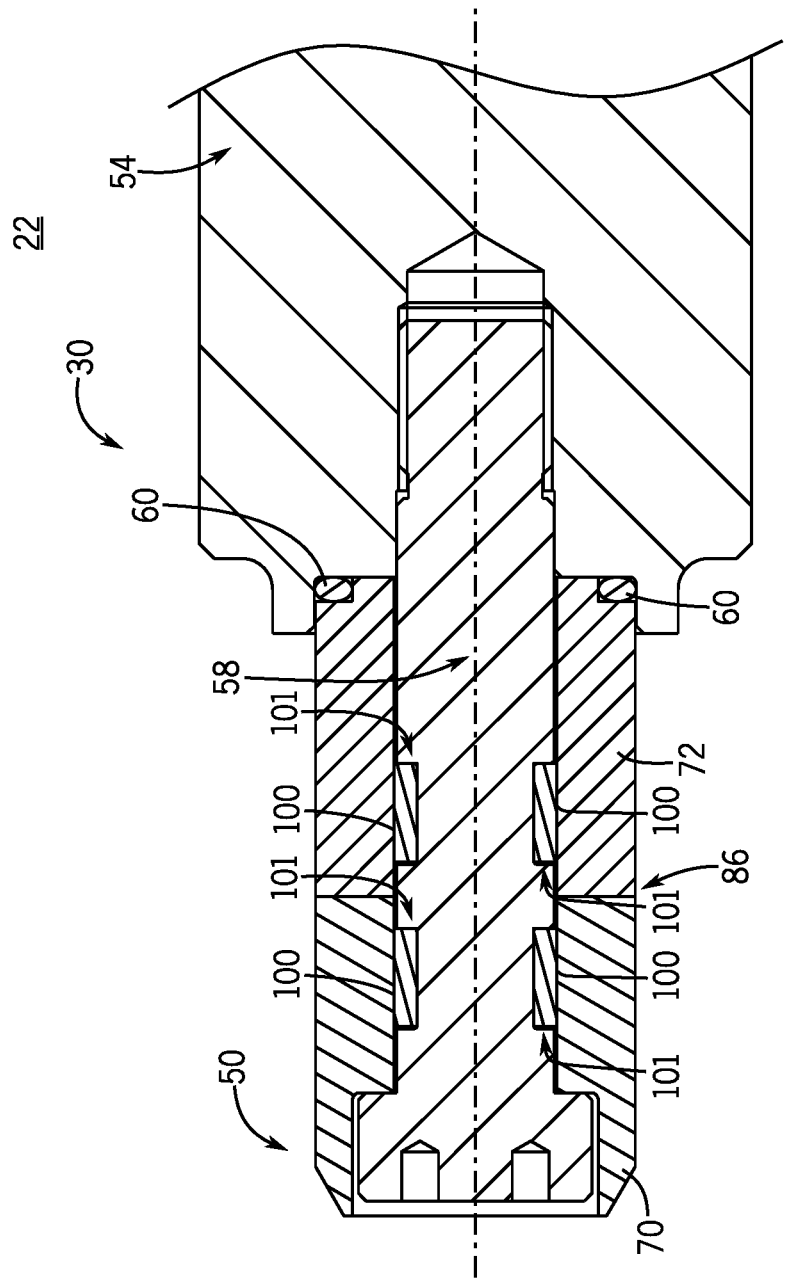
FIG. 3 is a cross-sectional side view of another embodiment of the choke plug of the choke valve of FIG. 1, illustrating a fastener and bearing features disposed in a tip portion of the choke plug, in accordance with an embodiment of the present disclosure.

For example, FIG. 3 is a cross-sectional side view of another embodiment of the tip portion 50 of the choke plug 30 having bearing features 100 instead of the shim 84. For example, the bearing features 100 may be disposed in one or more recesses 101 formed in the fastener 58. In such embodiments, the bearing features 100 may absorb vibration forces exerted on the first segment 70 and/or the second segment 72, thereby reducing potential degradation of the tip portion 50. The bearing features 100 may be "O"-rings, ball bearings, roller bearings, or any other suitable device for reducing stress on the joint 86 caused by vibration forces. In some embodiments, the bearing features 100 may also be utilized to generally align the first segment 70 and the second segment 72 such that the opening 88 may receive the fastener 58. As shown in the illustrated embodiment of FIG. 3, the seal 60 may also be disposed between the second segment 72 and the stem 54.

Figure 4:
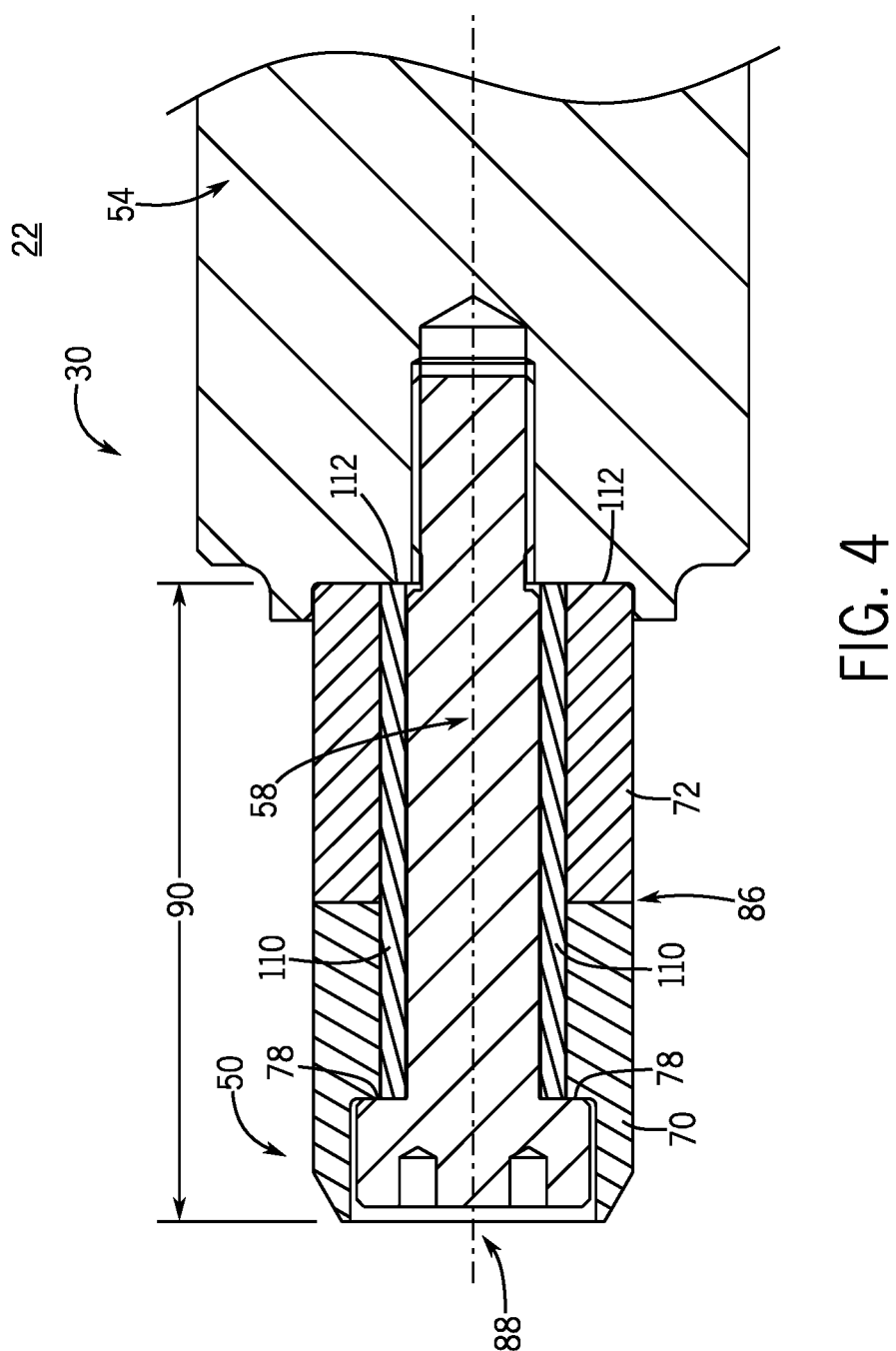
FIG. 4 is a cross-sectional side view of another embodiment of the choke plug of the choke valve of FIG. 1, illustrating a fastener and an alignment sleeve disposed in the tip portion of the choke plug, in accordance with an embodiment of the present disclosure.

In other embodiments, the seal 60 may not be included. For example, FIG. 4 is a cross-sectional side view of another embodiment of the tip portion 50 of the choke plug 30 without the seal 60 disposed between the second segment 72 and the stem 54. The embodiment of FIG. 4 also includes an alignment sleeve 110 disposed between the first segment 70 and the fastener 58 and the second segment 72 and the fastener 58. The alignment sleeve 110 may extend from the recess 78 of the first segment 70 to an axial surface 112 of the stem 54. In other embodiments, the alignment sleeve 110 may extend across the entire length 90 of the tip portion 50. In any case, the alignment sleeve 110 may form the opening 88 and may generally align the first segment 70 and the second segment 72 with one another.

Additionally, in some cases, the alignment sleeve 110 may be configured to enhance a seal between the second segment 72 and the stem 54. For example, the alignment sleeve 110 may include a resilient material (e.g., plastic or another flexible material) configured to compress as the fastener 58 is tightened. Accordingly, the alignment sleeve 110 may form a seal at the axial surface 112 to block fluid from flowing between the second segment 72 and the stem 54. Blocking fluid flow between the second segment 72 and the stem 54 may reduce a pressure differential between the tip portion 50 and the stem 54, thereby enabling the choke plug 30 to adjust the flow rate of fluid through the choke body 20 more effectively.

Figure 5:
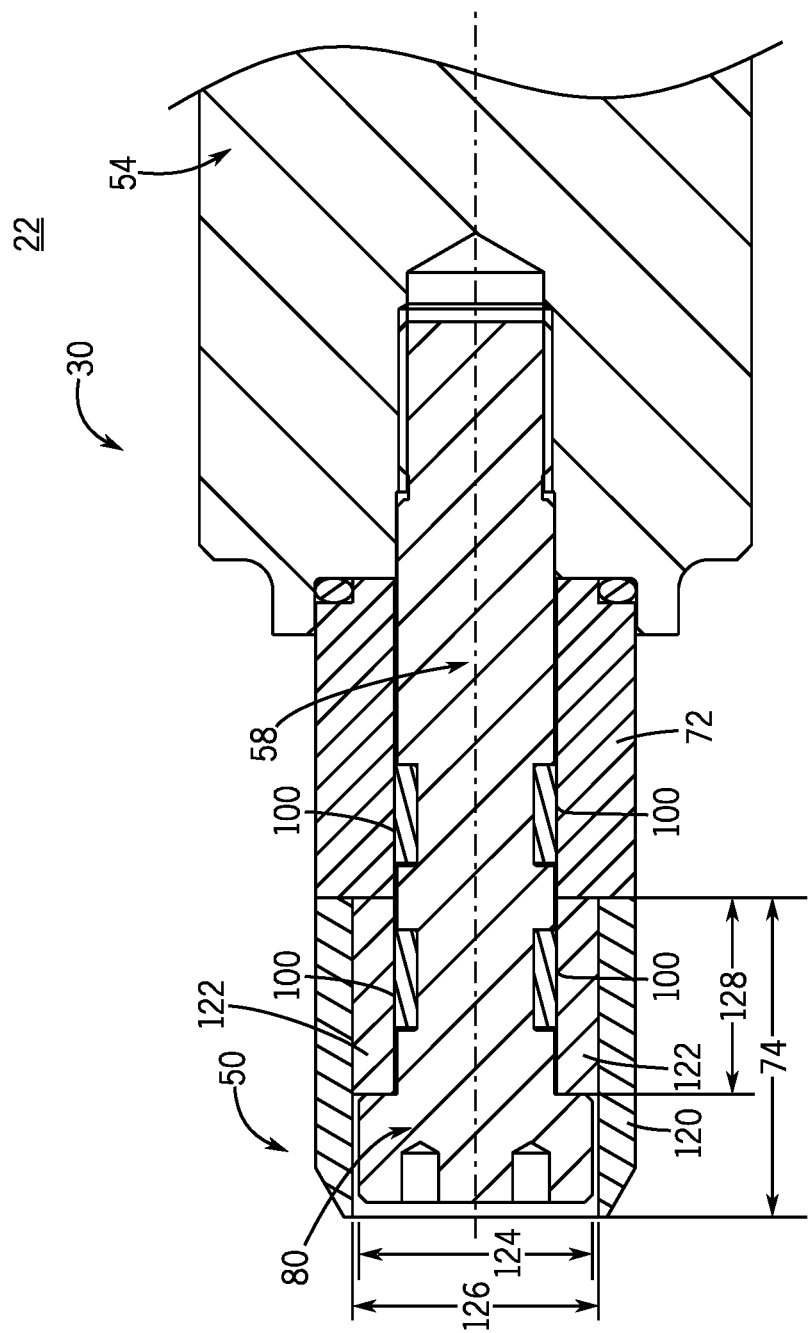
FIG. 5 is a cross-sectional side view of another embodiment of the choke plug of the choke valve of FIG. 1, illustrating a fastener contacting an insert segment of the tip portion, in accordance with an embodiment of the present disclosure.

In some cases, it may be difficult to form the recess 78 in the first segment 70 that contacts the head portion 80 of the fastener 58. For example, the first segment 70 may include a superhard material (e.g., the first material 52). However, machining (e.g., cutting, shaving, and/or trimming) superhard materials may be costly and/or time consuming. Accordingly, it may be desirable to minimize an amount of machining performed on the first segment 70, the second segment 72, and/or any other material in the choke plug 30 that may include the superhard material. As a non-limiting example, FIG. 5 is a cross-sectional side view of the tip portion 50 of the choke plug 30 where a first segment 120 does not include the recess 78. As shown in the illustrated embodiment of FIG. 5, an insert segment 122 may be disposed within the first segment 120 (e.g., an outer diameter 124 of the insert segment 122 is slightly less than an inner diameter 126 of the first segment 120). The insert segment 122 may include a length 128 that is less than the length 74 of the first segment 120. Therefore, the fastener 58 (e.g., the head portion 80) may be disposed fully within the first segment 120.

Including the insert segment 122 in the tip portion 50 may reduce costs by enabling a manufacturer to avoid machining the first segment 120, which may include the superhard material (e.g., the first material 52). Accordingly, in some embodiments, the insert segment 122 may include a machined piece of the second material 56 and/or a non-superhard material (e.g., tungsten carbide and/or a nickel alloy). In other embodiments, the insert segment 122 may include the superhard material, but may be available by a supplier, and thus, may not be machined. In any case, utilizing the insert segment 122 may reduce costs of the tip portion 50, but may still provide the benefit of enhancing the durability of the fluid-handling system 10 by providing a contact surface for the fastener 58 to couple the first segment 120, the second segment 72, and the stem 54.

As shown in the illustrated embodiment of FIG. 5, the tip portion 50 includes the bearing features 100 and the seal 60. However, in other embodiments, the tip portion 50 having the insert segment 122 may include the seal 60, the shim 84, the bearing features 100, the alignment sleeve 110, or any combination thereof.

Figure 6:
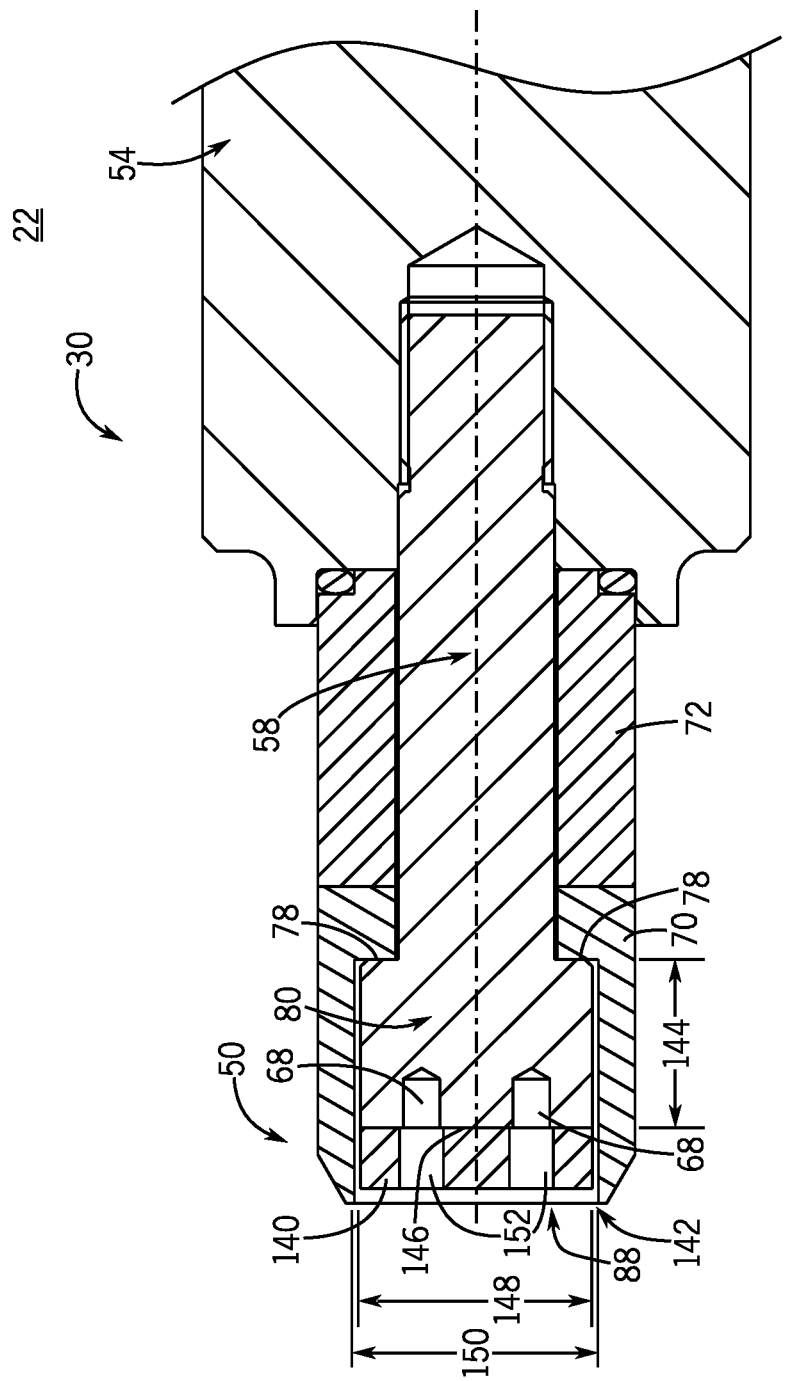
FIG. 6 is a cross-sectional side view of another embodiment of the choke plug of the choke valve of FIG. 1, illustrating a cap disposed over a fastener of the choke plug, in accordance with an embodiment of the present disclosure.

As discussed above, the tip portion 50 of the choke plug 30 may be subject to relatively high pressures and turbulent fluid flow that may lead to degradation such as erosion. Accordingly, it may be desirable to include a cap 140 at an end 142 of the first segment 70 (or first segment 120) to block the fastener 58 from the high pressure environment and fluid flow in the choke body 20. For example, FIG. 6 is a cross-sectional side view of the tip portion 50 of the choke plug 30 having the cap 140 disposed over the opening 88 (e.g., the end 142 of the first segment 70).

In some embodiments, the head portion 80 of the fastener 58 may include a length 144 that enables the fastener 58 and the cap 140 to fit entirely within the recess 78 of the first segment 70. In other embodiments, the recess 78 may be machined to extend further into the first segment 70 such that the fastener 58 and the cap 140 fit entirely within the first segment 70. In still further embodiments, the cap 140 may extend beyond the end 142 of the first segment 70 such that the fastener 58 fits entirely within the first segment 70, but the cap 140 fits partially within the first segment 70. In any case, the cap 140 may be configured to cover an end 146 of the fastener 58 (e.g., the head portion 80) from degradation and/or other wear that may be caused by relatively high pressures and fluid flow within the choke body 20. Accordingly, the cap 140 may include a diameter 148 that is generally the same as a diameter 150 of the head portion 80 of the fastener 58, such that the cap 140 generally covers the entire head portion 80 to block the fastener 58 from degradation. Using the cap 140 may enable the manufacturer to avoid machining a fastener that includes a superhard material, and instead machine a simple disc (e.g., the cap 140) that may be disposed over the fastener 58.

For example, the cap 140 may include a superhard material (e.g., the first material 52 or another superhard material) that may withstand the high pressure environment in which the tip portion 50 may be positioned. In some embodiments, the cap 140 may be brazed to the fastener 58 (e.g., the superhard material of the cap 140 may be brazed to the end 146 of the fastener 58). In other embodiments, an adhesive may be utilized to secure the cap 140 to the end 146 of the fastener 58. In still further embodiments, additional fasteners may be utilized to secure the cap 140 to the fastener 58. For example, the cap 140 may include openings 152, which may be generally aligned with the recesses 68 of the fastener 58. Accordingly, the additional fasteners may extend through the openings 152 and into the recesses 68, such that the cap 140 is secured to the end 146 of the fastener 58. The additional fasteners may be screws, bolts, rivets, threaded rods, or any other device configured to secure the cap 140 to the fastener 58.

Figure 7:
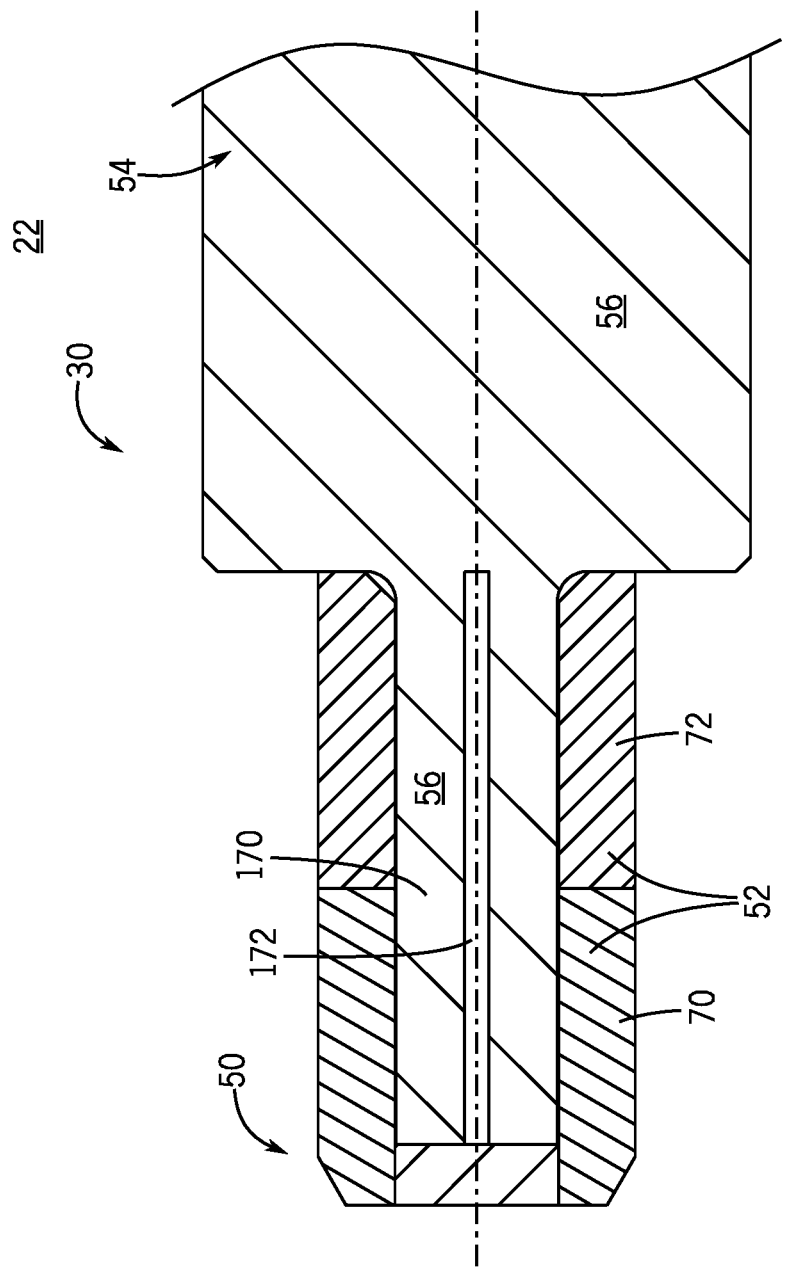
FIG. 7 is a cross-sectional side view of another embodiment of the choke plug of the choke valve of FIG. 1, illustrating an extension of a stem of the choke plug having one or more slots, in accordance with an embodiment of the present disclosure.

In some embodiments, the tip portion 50 of the choke plug 30 may include an extension 170 (e.g., a protrusion) extending from the stem 54 (e.g., as shown in FIG. 7). As a result, the tip portion 50 may not be coupled to the stem 54 using the fastener 58. However, as discussed above, the stem 54 may include the second material 56 (e.g., a material that is not a superhard material). Therefore, to block the extension 170 of the stem 54 from the relatively high pressure environment and fluid flow in the choke body 20, the extension 170 may be covered with the first segment 70 and the second segment 72, each of which may include the first material 52 (e.g., a superhard material).

In some cases, brazing the superhard material to the second material 56 (e.g., a material that is not a superhard material) or another non-superhard material may result in a bond between the first segment 70 and the stem 54 and/or the second segment 72 and the stem 54 that is susceptible to degradation. For example, brazing two materials together that have substantially different hardness values may lead to material degradation when the softer material undergoes thermal expansion during operation of the choke valve 14, but does not have enough available space to expand.

In some cases, the first segment 70 and/or the second segment 72 may be directly brazed to the extension 170 of the stem 54 to reduce manufacturing costs. To avoid degradation, the extension 170 may include one or more slots 172 as shown in FIG. 7, which is a cross-sectional side view of an embodiment of the choke plug 30 where the tip portion 50 includes the extension 170 of the stem 54. The one or more slots 172 in the extension 170 may provide additional space for the extension 170 to thermally expand. For example, the first segment 70 and the second segment 72 may be disposed over the extension 170. In some embodiments, the extension 170 may include the second material 56

(e.g., the same material as the stem 54) which may be substantially softer than the first material 52 (e.g., a superhard material) of the first segment 70 and/or the second segment 72. As such, the extension 170 may be subject to thermal expansion when exposed to operating temperatures of the choke valve 14. When the extension 170 incurs thermal expansion and little or no space is available to accommodate the increase in volume of the extension 170, material degradation may occur in the tip portion 50. Accordingly, the slots 172 in the extension portion 170 may provide additional space such that material degradation may generally be avoided.

Figure 8:
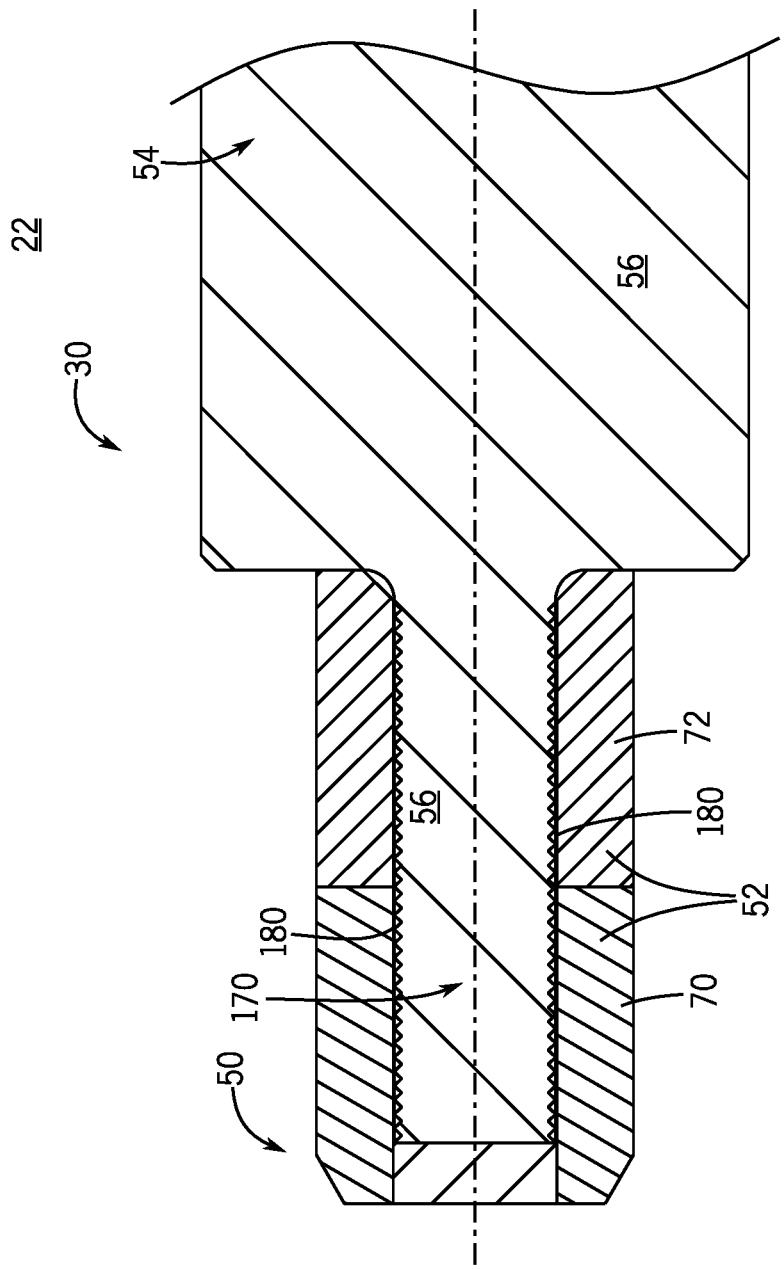
FIG. 8 is a cross-sectional side view of another embodiment of the choke plug of the choke valve of FIG. 1, illustrating an extension of the stem of the choke plug having a plurality of splines, in accordance with an embodiment of the present disclosure.

In other embodiments, the extension 170 may include other features that may provide additional space to account for thermal expansion. For example, FIG. 8 is a cross-sectional side view of the choke plug 30 where the tip portion 50 includes the extension 170 having a plurality of splines 180. Similar to the slots 172 of the embodiment shown in FIG. 7, the splines 180 provide additional space between the extension portion 170 and the first segment 70 and between the extension portion 170 and the second segment 72. Therefore, when the extension portion 170 incurs thermal expansion, material degradation of the tip portion 50 is generally avoided because of the additional space.

In other embodiments, the extension 170 may include threads in addition to, or in lieu of, the splines 180. The threads may enable the first segment 70 and/or the second segment 72 to be fastened to the extension 170. For example, the first segment 70 and/or the second segment 72 may also include threading that corresponds to the threads on the extension 170, thereby facilitating a connection between the extension 170 and the first segment 70 and/or the second segment 72. In some embodiments, the corresponding threading on the first segment 70 and/or the second segment 72 may be manufactured by any technique suitable for threading a component (e.g., electro discharge machining (EDM) and/or three dimensional (3D) printing).

Figure 9:
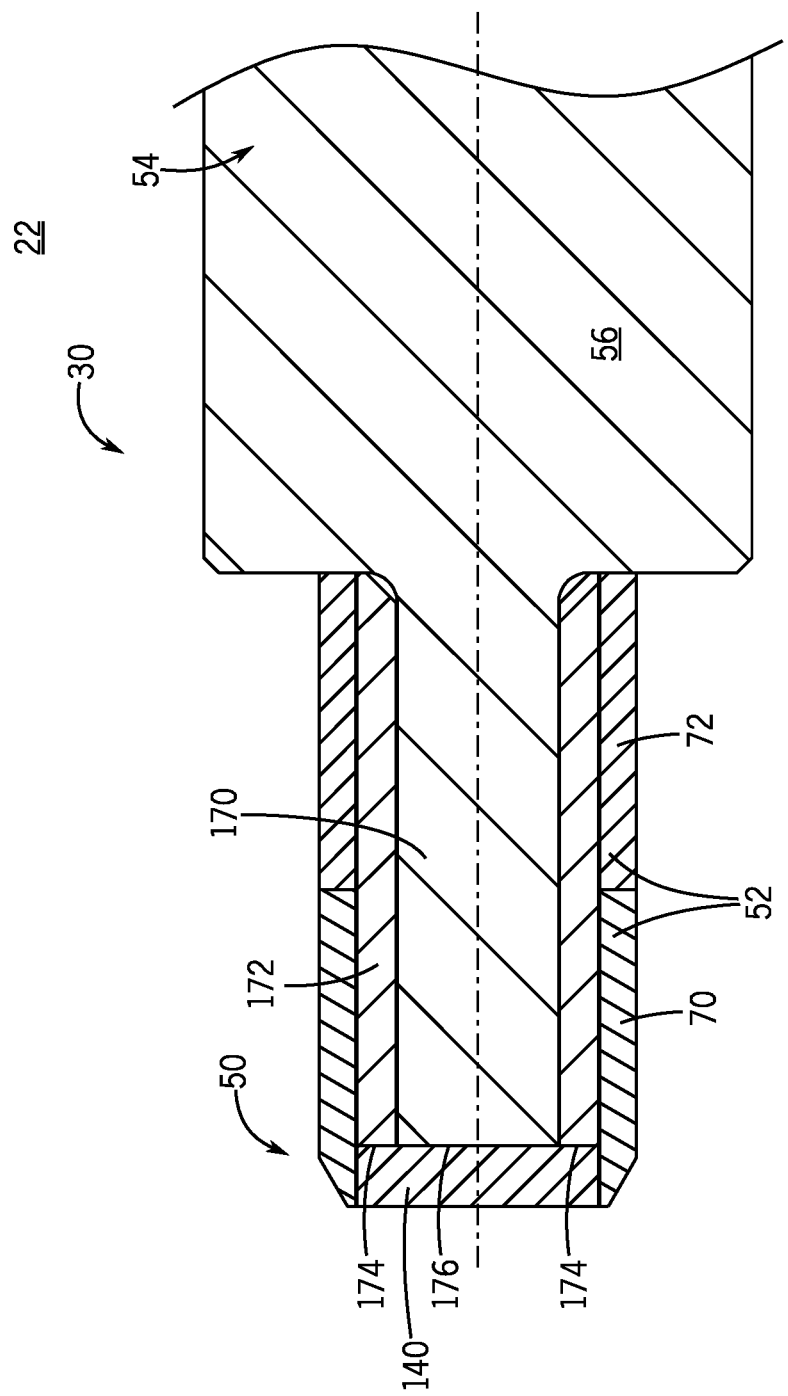
FIG. 9 is a cross-sectional side view of another embodiment of the choke plug of the choke valve of FIG. 1, illustrating an intermediate segment disposed between an extension of the stem and a first segment of the tip portion and the extension of the stem and a second segment of the tip portion, in accordance with an embodiment of the present disclosure.

In still further embodiments, it may not be desirable to braze the first segment 70 and/or the second segment 72 directly to the extension portion 170. For example, FIG. 9 is a cross-sectional side view of the tip portion 50 of the choke plug 30 that includes an intermediate segment 172 to enable the first segment 70 and the second segment 72 to cover the extension 170 without being directly brazed to the extension 170. As shown in the illustrated embodiment of FIG. 9, the intermediate segment 172 may include a material with an intermediate hardness (e.g., a material having a hardness value in between the hardness values of two other materials) when compared to the first material 52 (e.g., a superhard material) and the second material 56 of the stem 54. As a non-limiting example, the extension 170 of the stem 54 may include a nickel alloy material, the first segment 70 and/or the second segment 72 may include a diamond-containing material, and the intermediate segment 172 may include tungsten carbide (e.g., a material having a hardness value between the nickel alloy material and the diamond containing material). It should be noted that other materials may be utilized for each of the extension 170, the intermediate segment 172, the first segment 70, and the second segment 74.

The intermediate segment 172 may be brazed (e.g., coupled) to the extension 170, and the first segment 70 and/or the second segment 72 may be brazed (e.g., coupled) to the intermediate segment 172. Accordingly, components of the tip portion 50 may be coupled to one another without brazing components together that have materials with significant differences in hardness.

Additionally, the illustrated embodiment of FIG. 9 includes the cap 140. The cap 140 covers the extension 170 of the stem 54 as well as the intermediate segment 172 to block such components of the high pressure environment and fluid flow in the choke body 20. As shown in the illustrated embodiment of FIG. 9, the cap 140 does not include the openings 152 to receive fasteners that may secure the cap 140 to the tip portion 50. Accordingly, the cap 140 may be brazed to an outer edge 174 of the intermediate segment 172 and/or an outer surface 176 of the extension 170 of the stem 54. In other embodiments, the cap 140 may include the openings 152 and be secured to the tip portion 50 via fasteners that extend through the openings 152 and into the intermediate segment 172 and/or the extension 170. In still further embodiments, the cap 140 may be coupled to the intermediate segment 172 and/or the extension 170 via an adhesive or another suitable coupling technique.

Figure 10:
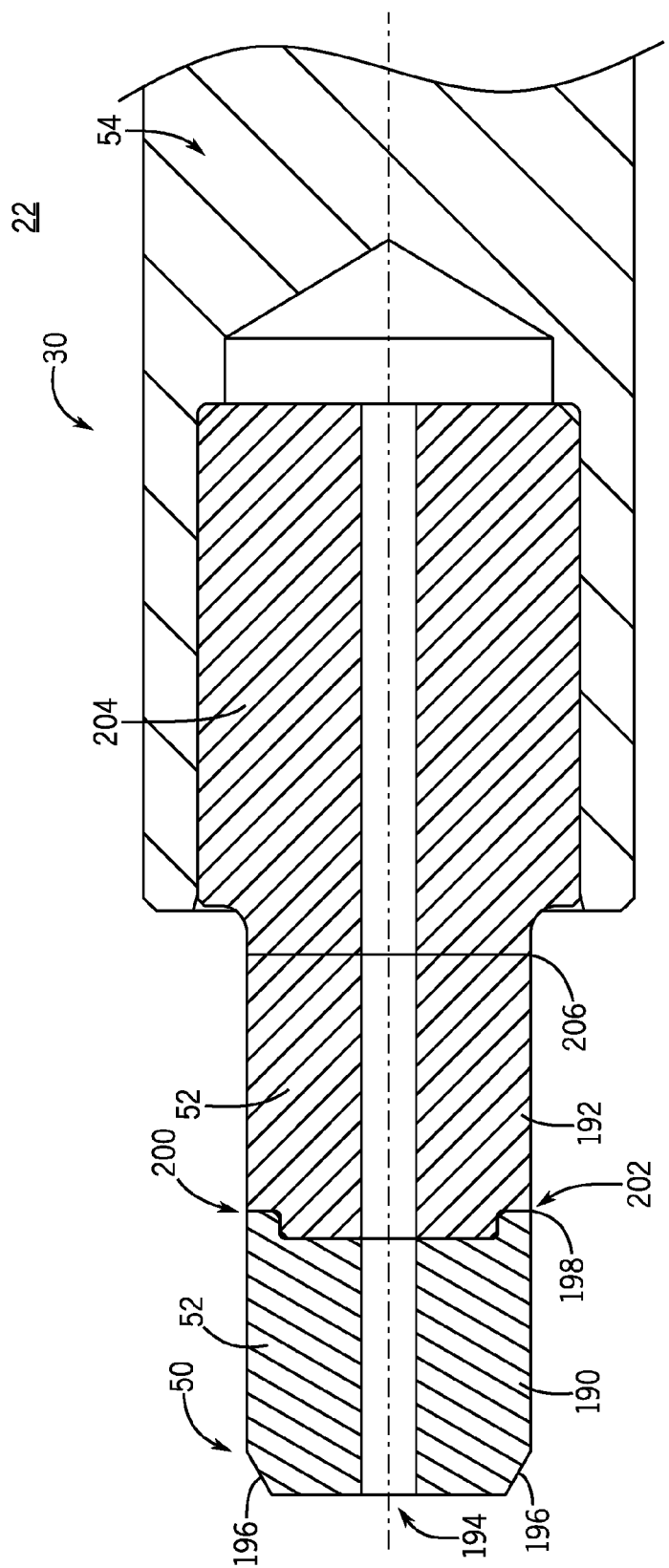
FIG. 10 is a cross-sectional side view of another embodiment of the choke plug of the choke valve of FIG. 1, illustrating a first joint configuration between a first solid segment, a second solid segment, and a plug body, in accordance with an embodiment of the present disclosure.

In some cases, pieces of superhard material (e.g., the first segment 70 and/or the second segment 72) may not include the opening 88 (or include an opening having a smaller diameter), and thus, they may not be suitable for receiving the fastener 58 and/or the extension 170 (e.g., the fastener 58 and/or the extension 170 may not fit within the first segment 70 and/or the second segment 72). For example, FIG. 10 is a cross-sectional side view of an embodiment of the tip portion 50 having a first segment 190 and a second segment 192. When coupled to one another, the first segment 190 and the second segment 192 may form an opening 194. However, the opening 194 may include a smaller diameter than the opening 88, such that the opening 194 is not configured to receive the fastener 58, the extension 170, or any other component that may couple the tip portion 50 to the stem 54.

As shown in the illustrated embodiment of FIG. 10, the first segment 190 includes a beveled edge 196, which may reduce stress and degradation to the tip portion 50 by facilitating flow of the fluid over the tip portion 50 (e.g., the beveled portion 196 may reduce degradation or stress applied to the tip portion 50 by fluid flow). Additionally, the first segment 190 and the second segment 192 may be coupled to one another at a joint 198. In some embodiments, the first segment 190 and the second segment 192 may be brazed to one another at the joint 198 to form a secure connection. In other embodiments, the first segment 190 and the second segment 192 may be coupled to one another using another suitable technique. As shown in the illustrated embodiment of FIG. 10, the joint 198 may include a stair-stepped configuration. The stair-stepped configuration may block fluid flow from a first end 200 of the joint 198 to a second end 202 of the joint, or vice versa (e.g., washout). For example, the stair-stepped configuration may force fluid to flow toward a higher pressure (e.g., upstream) in order to flow from the first end 200 to the second end 202. Accordingly, it may be desirable to include the stair-stepped configuration between the first segment 190 and the second segment 192 to enhance the durability of the joint 198.

However, in some cases, it may be expensive and/or time consuming to form (e.g., machine) a stair-stepped joint (e.g., the joint 198). Accordingly, the second segment 192 and a plug body 204 are coupled to one another at a second joint 206. The plug body 204 may be disposed in and/or coupled to the stem 54 via brazing, an interface fit, a weld, a fastener, an adhesive, or another suitable coupling technique. Additionally, in some embodiments, the plug body 204 may include the second material 56 and/or another suitable material that includes a hardness value less than the first material 52 included in the first segment 190 and/or the second segment 192. In other embodiments, the plug body 204 may include the first material 52 (e.g., a superhard material and/or the same material as the first segment 190 and the second segment 192). In some embodiments, the second segment 192 is brazed to the plug body 204. In other embodiments, the second segment 192 and the plug body 204 may be coupled to one another using another suitable technique. As shown in the illustrated embodiment of FIG. 10, the second joint 206 includes a linear (e.g., flat and/or straight) configuration. Because the second joint 206 may not be exposed to the high pressures and fluid flow as often as the joint 198, it may not be as susceptible to washout (e.g., fluid flowing through the joint 206) as the joint 198.

Figure 11:
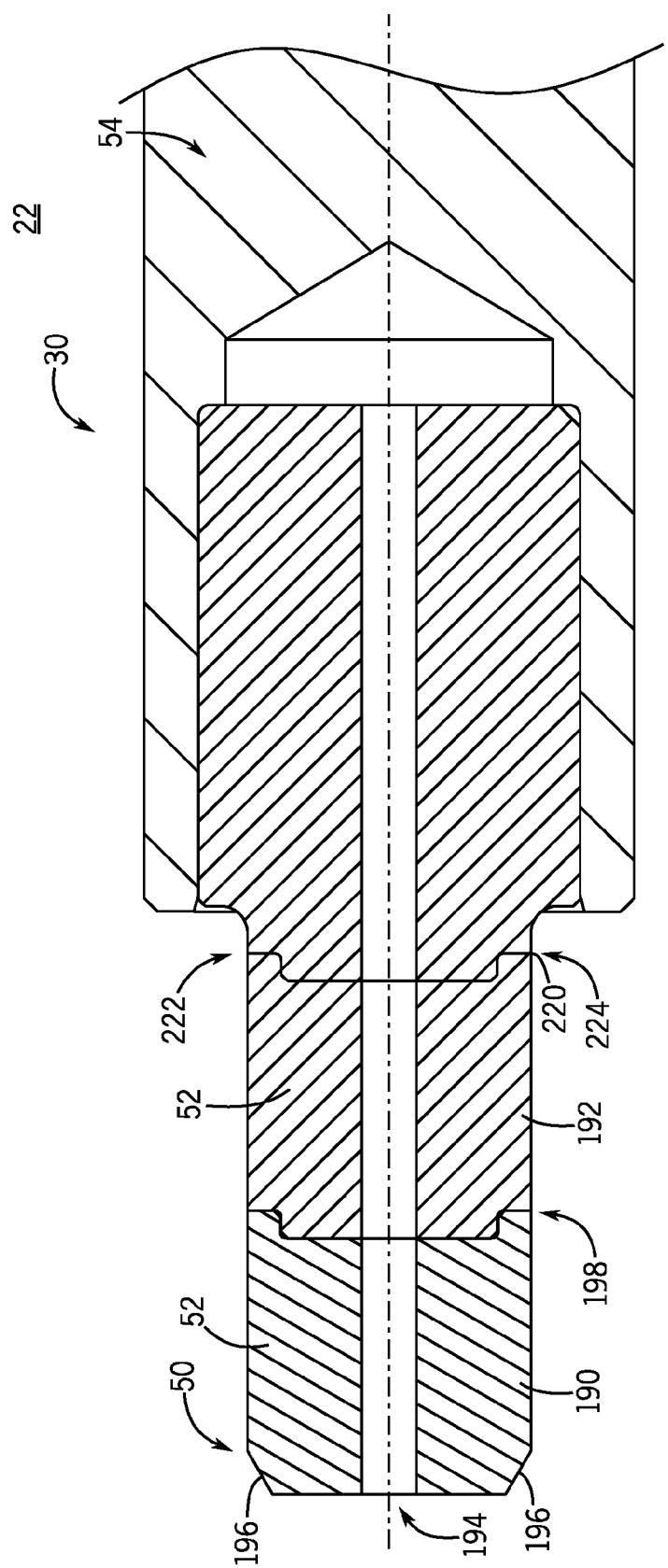
FIG. 11 is a cross-sectional side view of another embodiment of the choke plug of the choke valve of FIG. 1, illustrating a second joint configuration between a first solid segment, a second solid segment, and a plug body, in accordance with an embodiment of the present disclosure.

However, in other embodiments, it may be desirable to include a stair-stepped configuration at the second joint 206. For example, FIG. 11 is a cross-sectional side view of the tip portion 50 having the first segment 190 and the second segment 192, where both the first joint 198 and a second joint 220 include a stair-stepped configuration. As shown in the illustrated embodiment of FIG. 11, the second joint 220 includes the stair-stepped configuration rather than the linear configuration of the second joint 206. Accordingly, the second joint 220 may provide an enhanced seal in terms of blocking washout through the joint 220 (e.g., fluid flowing through a first end 222 of the second joint 220 to a second end 224 of the second joint 220, or vice versa).

Figure 12:
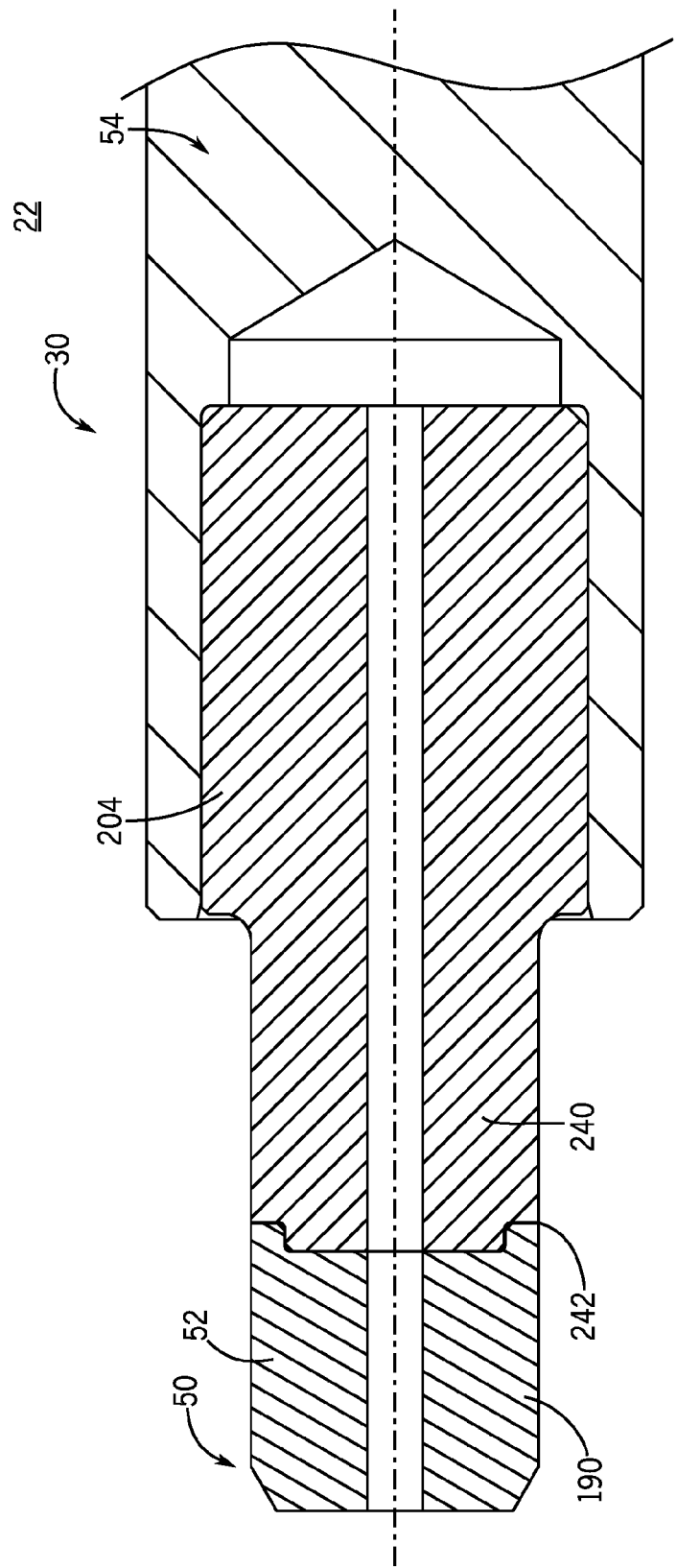
FIG. 12 is a cross-sectional side view of another embodiment of the choke plug of the choke valve of FIG. 1, illustrating a first solid segment coupled to an extension of a plug body, in accordance with an embodiment of the present disclosure.

In still further embodiments, the plug body 204 may include an extension 240 that may at least partially form the tip portion 50. For example, FIG. 12 is a cross-sectional side view of the tip portion 50 that includes the extension 240 of the plug body 204. As shown in the illustrated embodiment of FIG. 12, the first segment 190 is coupled to the extension 240 via a joint 242. The joint 242 may include the stair-stepped configuration or the linear configuration. Additionally, the first segment 190 may be brazed to the extension 240 at the joint 242. In some embodiments, the extension 240 may include the second material 56 and/or another material having a hardness less than the first material 52 (e.g., a superhard material) of the first segment 190. In other embodiments, the extension 240 may include a material different from the remainder of the plug body 204 and include the first material 52 (e.g., the superhard material) or any other suitable material.

Figure 13:
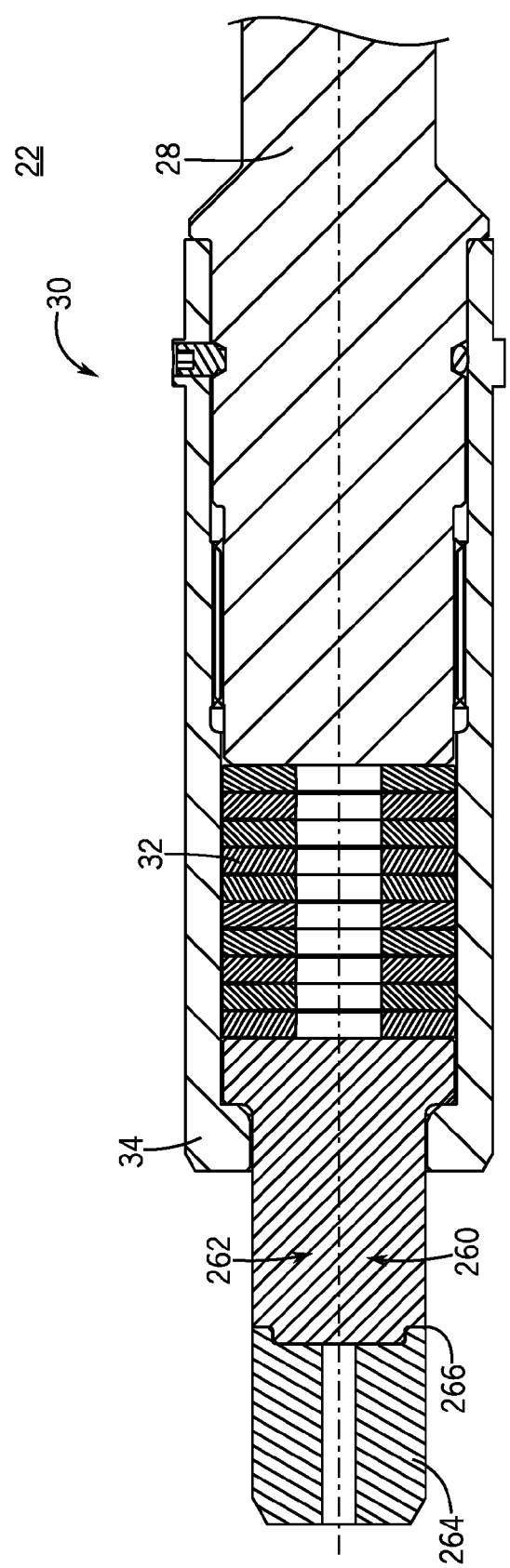
FIG. 13 is a cross-sectional side view of another embodiment of the choke plug of the choke valve of FIG. 1, illustrating one or more springs to apply a biasing force on the choke plug, in accordance with an embodiment of the present disclosure.

As discussed above, the one or more springs 32 may be disposed between the choke plug 30 and the shaft 28 such that a biasing force is applied to the choke plug 30, as shown in FIG. 13. During movement of the choke trim 22 to a closed position in which the choke plug 30 is fully seated against the seat 34 (e.g., an annular seat), the spring 32 may advantageously reduce a load applied by the choke plug 30 to the seat 34, thereby reducing wear on certain components of the choke valve 14. In such embodiments, a plug body 260 of the choke plug 30 may contact the springs 32 and thus be biased by the springs 32. Moreover, the plug body 260 may include an extension 262, which may be coupled (e.g., brazed) to a first segment 264 at a joint 266. As shown in the illustrated embodiment of FIG. 13, the joint 266 may include the stair-stepped configuration to substantially block washout when fluid flows through the choke body 20. In other embodiments, the joint 266 may include any other suitable configuration (e.g., linear).

Figure 14:
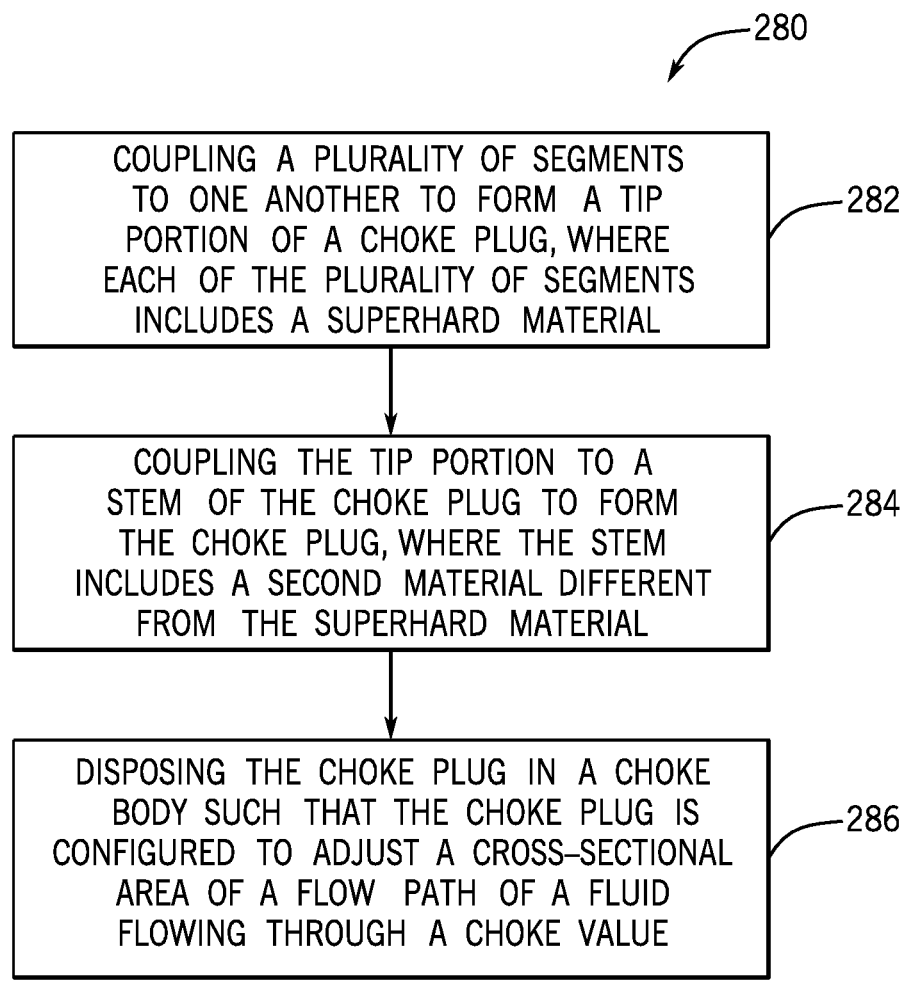
FIG. 14 is a block diagram of a process of manufacturing the choke plug of the choke valve of FIG. 1, in accordance with an embodiment of the present disclosure.

FIG. 14 is a block diagram of a process 280 that may be used to manufacture one or more of the previously discussed embodiments. For example, at block 282 a plurality of segments (e.g., the first segment 70, the second segment 72, the first solid segment 190, and/or the second solid segment 192) may be coupled to one another to form the tip portion 50 of the choke plug 30. Each of the plurality of segments may include the first material 52 (e.g., the superhard material). In some embodiments, the plurality of segments may brazed to one another such that each segment of the plurality of segments is secure to the tip portion 50. Additionally, at block 284, the stem 54 may be coupled to the tip portion 50 (e.g., having the plurality of segments) to form the choke plug 30. The stem 54 may include the second material 56 (e.g., a non-superhard material), different from the first material 52, and may be coupled to the tip portion 50 via the fastener 58, brazing, and/or any other suitable technique. At block 286, the choke plug 30 may be disposed in the choke body 20 such that the choke plug 30 may be utilized to adjust a cross-sectional area of a flow path of the fluid flowing through the choke valve 14.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is to cover all modifications, equivalents, and alternatives falling within the spirit and scope of the disclosure as defined by the following appended claims.

The invention claimed is:

1. A method, comprising:
coupling a tip portion to a stem of a choke plug to form the choke plug, wherein the tip portion comprises a first segment having a first opening, a second segment having a second opening, and a fastener extending through the first and second openings, wherein the first and second segments comprise a diamond based material, and wherein the stem comprises a second material different from the diamond based material;
disposing a shim about the fastener inside the first and second openings of the first and second segments, wherein the shim extends axially across a joint between the first segment and the second segment, wherein the shim is configured to generally align the first segment and the second segment with one another; and
disposing the choke plug in a choke body such that the choke plug is configured to adjust a cross-sectional area of a flow path of a fluid flowing through a choke valve.

2. The method of claim 1, wherein a first distal end of the first segment axially abuts a second distal end of the second segment.

3. The method of claim 2, wherein the fastener is configured to move through the first and second openings to secure the first and second segments to the stem.

4. A choke plug for a choke valve, comprising:
a tip portion configured to be disposed in a flow path of the choke valve, wherein the tip portion comprises a first segment having a first opening, a second segment having a second opening, and a fastener extending through the first and second openings, wherein the first and second segments comprise a diamond based material;
a shim disposed about the fastener inside the first and second openings of the first and second segments, wherein the shim extends axially across a joint between the first segment and the second segment, wherein the shim is configured to generally align the first segment and the second segment with one another;

a stem comprising a second material, wherein the stem is coupled to the tip portion such that the stem is positioned upstream of the tip portion relative to the flow path.

5. A choke valve, comprising:
a choke body;
a choke trim disposed in the choke body, wherein the choke trim is configured to adjust a cross-sectional area of a flow path in the choke body to adjust a fluid flow through the choke valve; and
a choke plug of the choke trim disposed in the flow path of the fluid flow, wherein the choke plug comprises:
a stem comprising a first material;
a tip portion coupled to the stem, wherein the tip portion comprises a first segment having a first opening, a second segment having a second opening, and a fastener extending through the first and second openings, wherein the first and second segments comprise a diamond based material; and
a shim disposed about the fastener inside the first and second openings of the first and second segments, wherein the shim extends axially across a joint between the first segment and the second segment, wherein the shim is configured to generally align the first segment and the second segment with one another.

6. The choke valve of claim 5, comprising a seal disposed axially between the second segment and the stem.

7. The choke valve of claim 5, wherein the diamond based material comprises polycrystalline diamond.

8. The choke valve of claim 5, wherein the first material comprises tungsten carbide.

9. The choke valve of claim 5, wherein the first material comprises a nickel alloy.

10. The choke valve of claim 5, wherein a first distal end of the first segment axially abuts a second distal end of the second segment, the first segment comprises a recess, and a head portion of the fastener is disposed in the recess to secure the first and second segments to the stem.

11. The choke valve of claim 5, comprising a brazed joint directly connecting the first segment and the second segment.

12. The choke valve of claim 5, wherein the joint between the first segment and the second segment comprises a stair-stepped interface.

13. The choke valve of claim 5, comprising one or more bearing features disposed within the tip portion, wherein the one or more bearing features are configured to reduce stress on the joint between the first segment and the second segment.

14. The choke valve of claim 5, comprising an alignment sleeve disposed within the tip portion, wherein the alignment sleeve extends across at least a portion of both the first segment and the second segment, and wherein the alignment sleeve is configured to generally align the first segment and the second segment with one another.

15. The choke valve of claim 5, wherein the fastener is configured to move through the first and second openings to secure the first and second segments to the stem.

16. The choke valve of claim 5, wherein the shim comprises a third opening, and the fastener is configured to move through the first, second, and third openings to secure the first and second segments to the stem.

17. The choke valve of claim 5, wherein the stem extends at least partially about the second segment.

18. The choke valve of claim 5, comprising an annular seat, wherein the tip portion of the choke plug is configured to abut the annular seat.

* * * * *